Fig.4

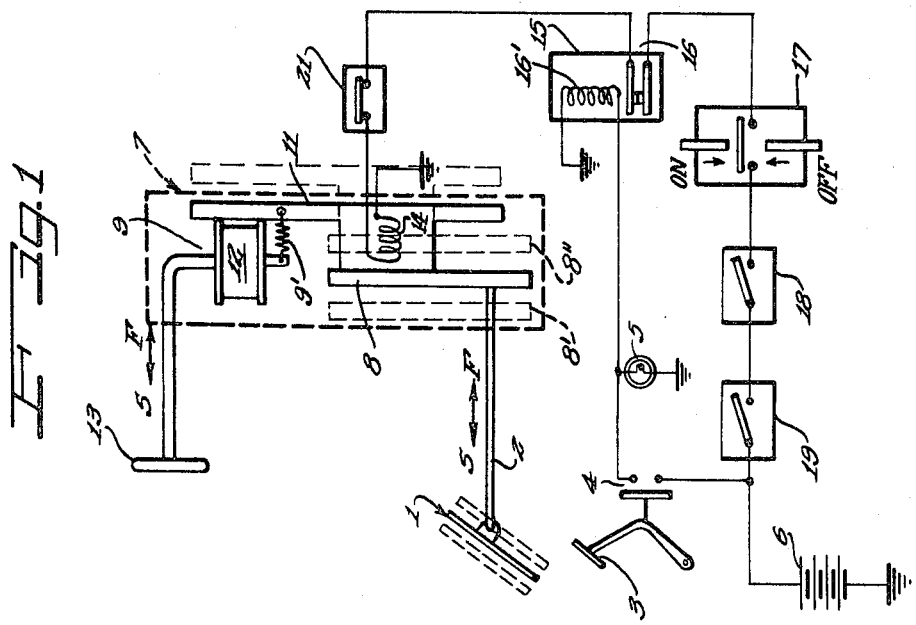
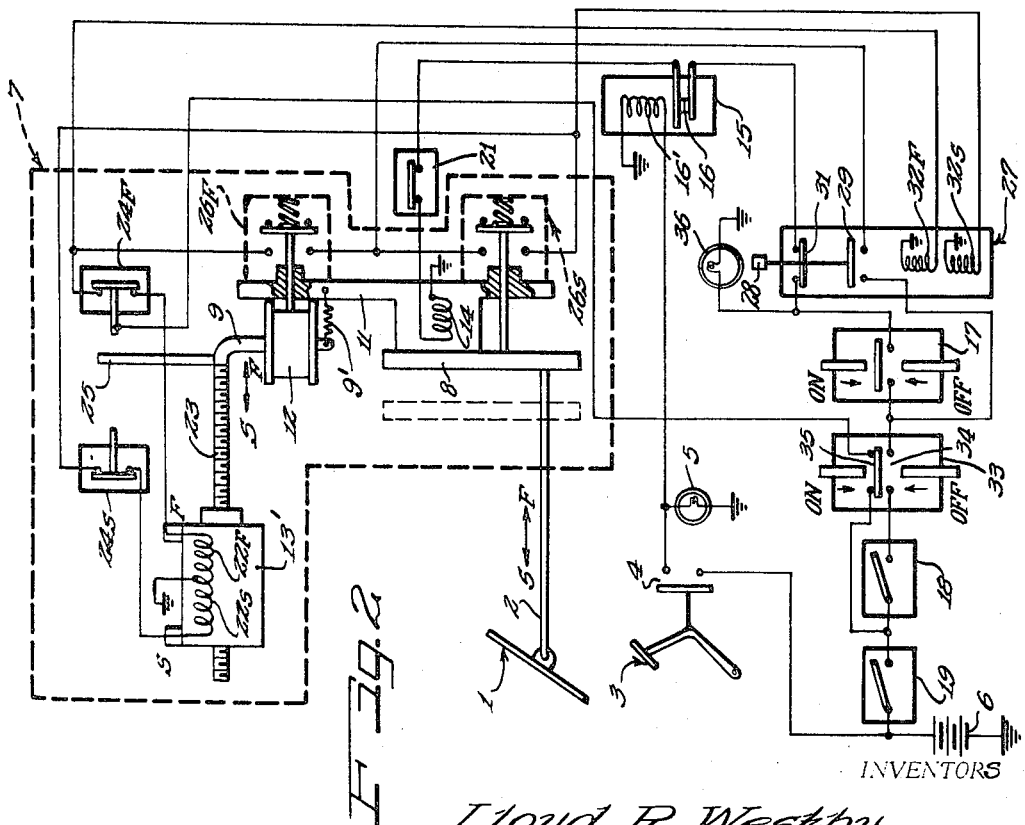

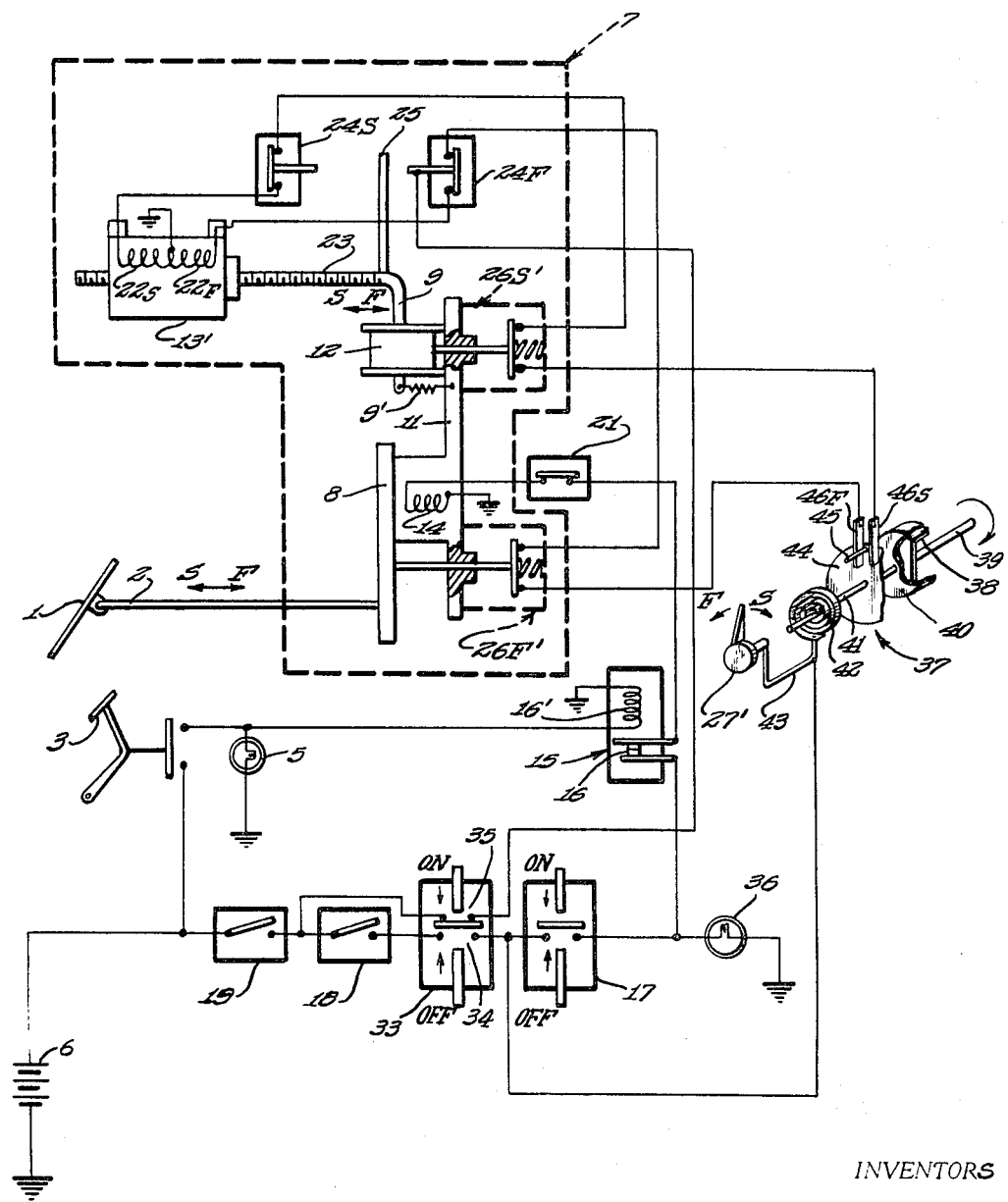

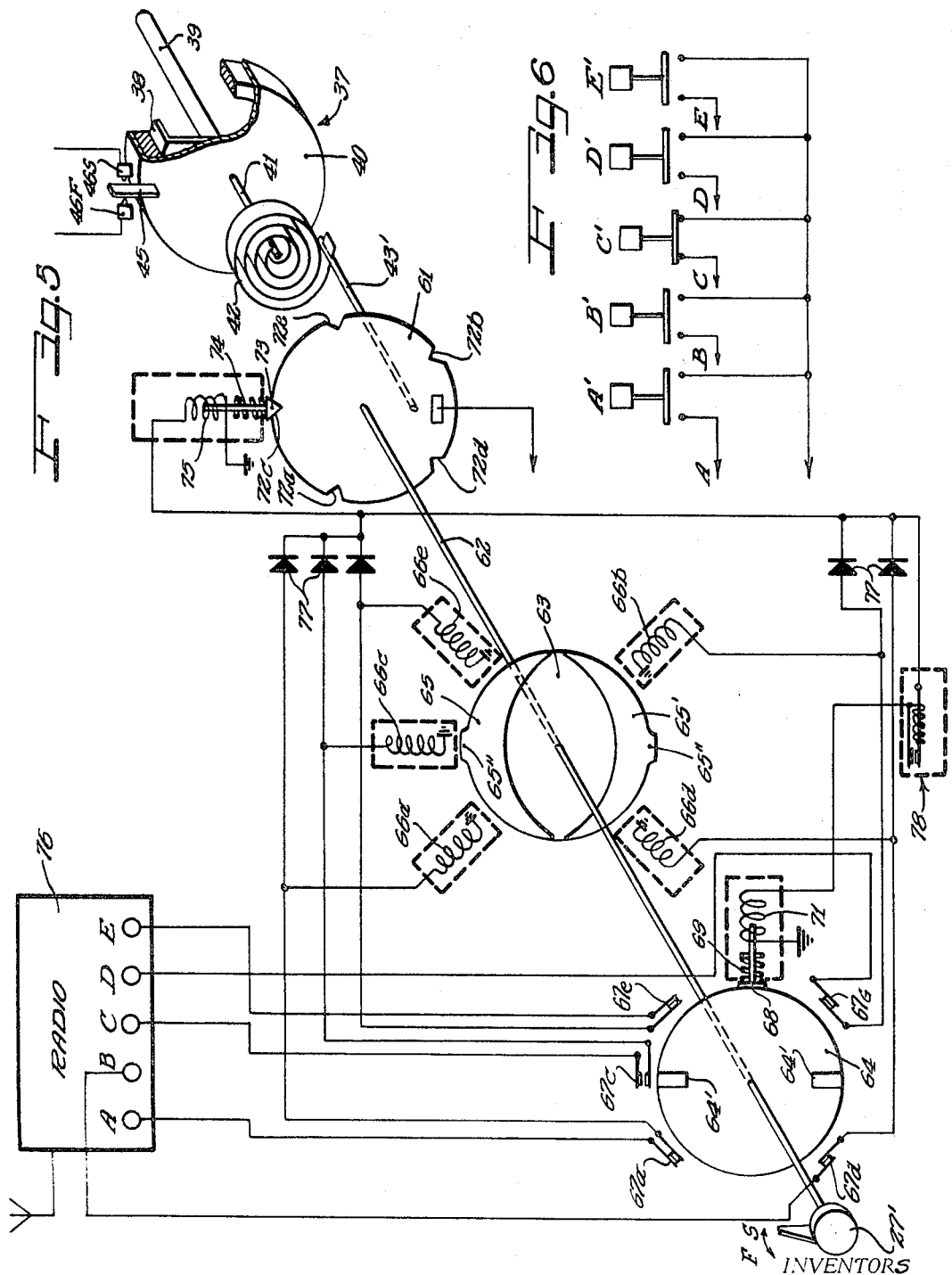

United States Patent Office 3,476,204
Patented Nov. 4, 1969

3,476,204
VEHICLE SPEED CONTROL DEVICE
Lloyd R. Westby, P.O. Box 233, Wayne, Ill. 60184, and Francis H. Bourgeois, P.O. Box 84, Oak Park, Ill. 60303
Filed Nov. 17, 1967, Ser. No. 683,995
Int. Cl. B60k 27/00; F02d 11/10; F16d 67/00
U.S. Cl. 180—98
20 Claims

ABSTRACT OF THE DISCLOSURE

A vehicle speed control system adapted to be operatively connected to the throttle and brake structures of a vehicle having a control actuating mechanism which includes a member operatively connectable to the vehicle engine throttle, a speed adjusting member cooperable with the first member for determining the adjusted position of the latter, and the third member forming the operative connection between said first two members, in which said third member is releasably connectable with the other members, the means operatively connecting said second and intermediate members being operative to release upon the application of over-riding pressure on the manual throttle control means of the vehicle, and the means operatively connecting the first and intermediate members being operatively connected to the vehicle brake system and responsive to actuation thereof to effect release of the first member from the intermediate member. In addition to being manually controllable, the speed adjusting member may be motor actuated and cooperable with means for sensing the vehicle speed whereby said speed adjusting member may be actuated in accordance with variations in the vehicle speed to compensate for such variations, as well as enable a remote control by radio or the like.

CROSS REFERENCES TO RELATED APPLICATIONS

The present invention is directed to a vehicle speed control system which employs a control structure adapted to be connected to the vehicle speed controlling means such as the vehicle carburetor control linkage, and which in several embodiments may be adjusted under the control of speed sensing mechanisms whereby corrections may be applied to the vehicle speed in a predetermined manner. The control actuating mechanism is more or less schematically illustrated herein and may employ a specific construction such as illustrated in our copending application, Ser. No. 583,192, filed Sept. 30, 1966 (now Patent No. 3,403,573) and entitled "Control Device." Likewise, as hereinafter described in greater detail, the sensing mechanisms utilized in the present system may embody constructions such as illustrated in our co-pending applications, Ser. Nos. 635,881 and 635,882, both filed on May 3, 1967 (now Patents No. 3,401,566 and No. 3,394,595, respectively) and respectively entitled "Sensing Control Device" and "Sensing Device."

BACKGROUND OF THE INVENTION

The present invention relates generally to control systems, and more particularly to systems for controlling the operation of mechanisms as for example the speed of a vehicle. While the invention may be applicable to numerous other types of equipment, it is hereinafter described in connection with its use as a speed control for vehicles and the like.

SUMMARY OF THE INVENTION

In the past there has been numerous speed control systems for automobiles, and various types of such control systems are being installed on current auto models. These have generally followed types of relatively exotic designs employing electronic circuits, etc. and considerable difficulty has been experienced in connection with the maintenance and servicing of this type of equipment, particularly in the absence of workers specially skilled in such field.

The present invention therefore has among its objects the production of such a control system which, while very efficient for the purposes intended, is relatively extremely simple in construction, capable of being serviced by the average trained mechanic and substantially completely foolproof in its operation, in particular being so designed that the possibility and danger of improper operation and thus improper control of the vehicle, is substantially completely eliminated.

These advantages are gained in the present invention in combination with a control mechanism of very simple construction having three cooperable members, the first of which is adapted to be connected to the vehicle engine throttle, the second being arranged to determine the position of the first member and thus the speed of the vehicle, and the third member being in the form of an intermediate member which is operative to selectively connect the first two members. By the application of over-riding forces on the throttle, separation may be effected from the second and intermediate members to permit full throttle advancement, while the means operatively adapted to connect the intermediate member with the first member is operatively controlled by the brake pedal whereby, upon application of the vehicle brakes, the first member is operatively disconnectd from the intermediate member to permit the throttle to return to a minimum speed position.

All forms of the invention illustrated may be utilized in either of two ways, the first, hereinafter referred to as "commute" operation, being effective to impart a signal to the vehicle operator when he has reached the speed set, and the other, hereafter referred to as "cruise" operation, being effective to hold the vehicle throttle at the selected position. Where compensation is included, the second member is automatically varied to compensate for the changes in the engine speed in response to the operation of a sensing device operatively connected to the speedometer of other elements responsive to the vehicle speed.

DESCRIPTION OF THE DRAWINGS

In the drawings wherein like reference numbers indicate like or corresponding parts:

FIG. 1 is a schematic diagram illustrating the utilization of the invention in a manually adjustable control system;

FIG. 2 is a schematic diagram similar to FIG. 1 utilizing a motor control circuit whereby adjustment may be automatically effected by actuation of a manual push button;

FIG. 3 is a schematic diagram similar to FIG. 2 providing automatic compensation and adapted to employ a knob adjustment;

FIG. 4 is a schematic diagram similar to FIG. 2 employing push button adjustment and provided with automatic compensation;

FIG. 5 is a schematic diagram of a radio controlled, compensating arrangement which may be directly substituted in the system of FIG. 3; and FIG. 6 is a schematic diagram of a series of push button switches which may be employed in place of the radio control circuitry.

DESCRIPTION OF THE PREFERRED EMBODIMENTS

Manually adjustable construction (FIG. 1)

Referring to FIG. 1, the reference numeral 1 indicates generally the accelerator pedal or manual throttle of a vehicle which is normally operatively connected to the vehicle carburetor or equivalent (not shown) by suitable linkage, one member of which is designated by the numeral 2. The vehicle brake pedal designated by the reference numeral 3 is operatively connected to a switch 4 whereby upon actuation of the brake pedal the switch 4 is closed to complete a circuit between a stop light or lamp 5 and the vehicle battery 6.

Operatively connected to the linkage 2 and adapted to be actuated thereby is a control actuating mechanism or unit, designated as a whole by the reference 7, and comprising a first member 8 which is directly connected to the linkage 2 and moveable at all times with movement of the accelerator pedal 1, whereby the position of the member 8 in the example illustrated in FIG. 1 may move laterally, one changed position being illustrated in dotted lines. To facilitate an understanding of the invention and simplify the drawings, all movement of the various parts are illustrated as being straight line movements. From a practical matter, the accelerator and brake pedal would normally be pivoted and the moveable elements of the control mechanism 7 likewise may be constructed for pivotal movement, as for example, as illustrated in the co-pending application, Ser. No. 583,192, previously referred to. Cooperable with the member 8 is a second speed adjusting member, indicated generally by the numeral 9, adapted to be operatively connected to the member 8 by an intermediate member 11, suitably disposed for movement with the member 8. In the embodiment illustrated, the member 11 is adapted to be normally maintained in operative engagement with the member 9 by magnetic means which, in the embodiment illustrated, comprises a permanent magnetic 12 carried by the member 9 and adapted to attract and hold the adjacent portion of the member 11, with a least such portion being constructed of a paramagnetic material for cooperation with the magnet. In addition thereto, the members 9 and 11 are normally biased in an engaged position by means of a tension spring 9' the opposite ends of which are suitably connected to the respective members.

The position of the member 9 and magnet 12 with respect to the member 8 may be manually effected by means of the handle 13, the construction being such that the member 9 will be fixedly maintained in any of its adjusted positions.

In operation of the structure thus far described, it will be apparent that the members 9 and 11 may cooperate to form a stop for the member 8, such stop being disposed in the path of the member 8 as the latter is moved in a direction to accelerate the vehicle. Thus assuming that the handle 13 is so actuated that the member 9 and magnet 12 are positioned to dispose the member 11 at approximately the mid point of the accelerator travel, as illustrated in FIG. 1, the accelerator will move freely throughout the first half of its travel without any restriction whatsoever, and obviously no materially greater force is required to move the accelerator pedal with the member 8 attached thereto as in the standard vehicle without such a speed control. However, when the accelerator reaches a point where the member 8 engages the member 11, further movement of the accelerator pedal in the same direction will be resisted by two forces, the first being the magnetic attraction between the permanent magnet 12 and the member 11, and second the action of the spring 9'. The operator will therefore at this point feel a definite resistance to further downward movement of the accelerator pedal, and if additional speed is desired it will be necessary for the operator to apply sufficient force on the accelerator pedal to overcome the forces tending to maintain the members 9 and 11 in engaged relation. As soon as this force is reached, the member 11 will break away from the magnet 12, such action however being opposed by the spring 9', whereby additional force is required to move the accelerator pedal, following "over-ride," than was originally required during the first half of the accelerator travel prior to engagement of the member 8 with the member 11. Upon release of the accelerator pedal, the members 8 and 11 will return as a unit until the member 11 engages the member 9 at which point it will have returned to its original position, and the accelerator pedal may freely continue to its minimum position.

Means are also provided to retain the accelerator pedal in the selected set position of the control, which means includes an electromagnet on the member 11, having a winding 14 arranged to magnetically retain the member 8 in engagement with the member 11 when the winding is energized, such winding being so designed that it will exert sufficient magnetic attraction to retain the member 8, and with it the accelerator pedal 1, in the desired set position, overpowering the return spring for the accelerator linkage etc.

The electrical circuit for the control of the electromagnet winding 14, in the embodiment of the invention illustrated in FIG. 1, comprises a relay 15 having a pair of normally closed contacts 16 which are in series with the winding 14, an on-off switch 17, and if desired a governor controlled switch 18, which in turn is connected to the ignition switch 19 whereby the winding 14 may be energized only when the ignition switch is closed. The switch 18 is included merely for the purposes of illustration in the event it is desired to permit energization of the winding 14 only when the vehicle has exceeded a predetermined speed, as for example 20 miles an hour, and in addition, if desired a switch 21 may be provided, herein designated a "redundant switch" which is included merely as a safety device and comprises a suitably designed switch, for example a mercury switch, which will open under predetermined conditions as for example upset of the vehicle, to release the accelerator in the event of an accident. This switch could also be so designed that it would be responsive to excessive shocks as for example those resulting from a collision of the vehicle with another object.

The winding 16' of the relay 15 is operatively connected in parallel with the stop light lamp 5, and thus energization of the winding is controlled by closure of the brake switch 4 in response to actuation of the brake pedal 3.

In operation of the circuit including the winding 14, which forms a "cruise" circuit, upon closure of the switch 17, and assuming that the switches 18, 19, and 21 are closed, the winding 14 will be energized so that upon positioning of the member 8 as illustrated in solid lines in FIG. 1, the electromagnet will retain the member 8 in the position determined by the position of the handle 13 and member 9. Depression of the accelerator pedal until the member 8 engages the member 11 will then result in retention of the member 8 in engagement with the member 11 upon release of pressure on the accelerator pedal. In other words the vehicle will continue to travel at a speed as set by the position of the handle 13. However, in the event it is necessary to slow down or stop the vehicle, upon actuation of the brake pedal 3, closing of the switch 4 and energization of the winding 16' of the relay 15, the contacts 16 thereof will open breaking the power supply to the winding 14, releasing the accelerator pedal to permit its return in its usual manner to minimum speed position.

While we have illustrated the use of a relay 15 to effect opening of the circuit to the winding 14, if desired the brake switch 4 could be of double-pole construction, including normally closed contacts corresponding to the contacts 16 which would be open upon actuation of the brake pedal and thus break the power supply to the winding 14. The use of the relay however is of advantage in installation of the device on older cars as it is unnecessary to touch the brake switch, it being readily possible to effect operative connection of the winding 16′ into the brake light circuit as such circuit normally is brought up to the turn indicator switch of the vehicle.

Thus the embodiment in FIG. 1 may be utilized as an adjustable stop which may be over-ridden when desired or may be utilized as a "cruise" control to hold the accelerator at a preset position from which it may be over-ridden in the same manner, as previously described, or released upon application of the brake pedal.

In the event the vehicle employs a clutch pedal, the latter can be provided with a switch suitably disposed in the circuit to the relay winding 16′ or in the circuit to the magnet winding 14 whereby the latter also will be de-energized in the event that such pedal is depressed, irrespective of actuation of the brake pedal.

Push button adjustable construction (FIG. 2)

The construction illustrated in FIG. 2 utilizes the same general arrangement and circuit of FIG. 1 but employs electric motor actuated means for effecting the speed adjustment, which is controlled by a push button adjustment switch whereby the accelerator may be depressed to the desired speed setting and the push button actuated, following which the motor will automatically set the mechanism to the selected speed position.

In addition to the inclusion of an electric motor, cooperable limit switches, and the push button adjustment switch, two additional switches are provided, which in the embodiment illustrated are mounted on the intermediate member 11 and controlled by the relative positions of the members 8 and 9 with respect to the intermediate member 11.

In the particular embodiment illustrated, the motor 13′ is illustrated as having respective windings 22S and 22F, the former being adapted to actuate the motor 13′ in a direction to adjust the mechanism to a slower speed and the latter winding being operative to adjust the mechanism to a higher speed. In this embodiment, the motor is illustrated as having a hollow drive shaft which is threaded to receive an axially moveable screw 23 which is rigidly connected to the member 9, with axial movement of the screw 23 being operative to effect adjustment of the member 9 and magnet 12 in substantially the same manner as accomplished by the handle 13. Cooperable with the respective windings are limit switches 24S and 24F which are of the normally closed type and adapted to be opened by engagement therewith of the actuating lug 25 moveable with the screw 23 and member 9, whereby the corresponding limit switch will be opened at the extreme end of the screw travel in particular direction involved.

Mounted on the member 11 is an increase speed control switch 26F and a decrease speed control switch 26S, both switches being illustrated as being spring biased in closed position. The switch 26F is adapted to be opened when the member 9 is operatively engaged with the member 11 while the switch 26S is adapted to be opened when the member 8 is operatively engaged with the member 11, the particular switches illustrated being provided with respective actuating stems which are disposed in the path of the cooperable members 8 or 9 and adapted to engage the corresponding member as the latter approaches the intermediate member 11 to effect opening of the associated switch. The motor 13′ is adapted to be manually controlled for setting the desired speed position of the member 9 and thus of the members 11 and 8, under the control of a master adjusting switch indicated generally by a numeral 27, which is illustrated as being of the push button type having an actuating button 28 and two pairs of contacts 29 and 31, contact 29 being normally open and the contact 31 being normally closed. In the embodiment illustrated, the switch 27 is also provided with a pair of windings 32F and 32S, either of which is operative, when energized, to maintain the push button 28 in its "in" or actuated position in which the contacts 29 are closed and the contacts 31 opened.

In addition to the "cruise" switch 17, this embodiment of the invention utilizes a separate on-off switch 33 which is provided with two pairs of contacts 34 and 35, the contacts 34 normally being open when the switch is in its "off" position, in which case the contacts 35 are closed, and when in the "on" position the conditions are reversed, the contacts 35 being open and the contacts 34 being closed. The contacts 34, when closed, are operative, assuming the switches 18 and 19 to be closed, to supply power to one contact of the switch 17 and one of the contacts 29 of the switch 27, the other contact of the latter being operatively connected to one contact of each of the switches 26F and 26S. The other contact of switch 26F is operatively connected to the limit switch 24F and other contact of the switch 26S is operatively connected to limit switch 24S. Thus, when the contacts 29 are closed, depending upon the positions of the switches 26F and 26S, power may be supplied to either of the windings 22S or 22F of the motor 13′. Assuming under such conditions that the contacts of the switch 26F were closed, current could flow to the winding 22F of the motor from the switch 33, over contacts 29, contacts 26F and 24F to energize the winding 22F, or from contacts 29 over contacts 26S, 24S to energize the winding 22S. It will be noted that the winding 32F of the switch 27 is operatively connected to the limit switch 24F and thus in parallel with the winding 22F, while the winding 32S is connected to the limit switch 24S and thus in parallel with the winding 22S. Consequently, in the event the switch 27 is actuated, current may flow to either of the windings of the motor, depending upon the positions of the switches 26F and 26S, and if current is so applied, the corresponding magnet winding 32F and 32S will be energized to retain the switch 27 in actuated position until the switch 26F or 26S involved is opened. The contacts 31 operatively connect power to the magnet winding 14 when the switch 27 is in its non-actuated position, assuming that the "cruise" switch 17 is in the "on" position and thus supplying power to contacts 31. To impart a visual indication of the "on" or "off" condition of the "cruise" switch 17, a pilot lamp 36 may be provided which is operatively connected to the switch 17 whereby the lamp 36 will be illuminated when both of the switches 17 and 33 are in their "on" position. As in the construction illustrated in FIG. 1, the winding 16′ of the relay 15 is operatively connected to the stop light switch 4 and the contacts 16 of the relay are operatively connected to the electromagnet winding 14 in series with the redundant switch 21.

The operation of this embodiment of the invention is as follows:

Assuming that switches 18, 19 and 33 are in their "on" positions, the switch 17 is in its "off" position and the adjustment switch 27 is in its rest position, illustrated, the member 8 will not be maintained in engagement with the member 11 but will be free to be in normal minimum speed position in the absence of pressure on the accelerator 1. In the event pressure is applied to the accelerator pedal 1, the latter and the member 8 may be freely moved until the member 8 engages the member 11 which thereby functions as a stop for the member 8, restricting further movement in a speed decreasing direction until sufficient over-riding pressure is applied to the pedal 1 and thus to the member 8 to effect disengagement of the member 11 from the member 9, following which the accelerator pedal may, if desired be moved to its maximum speed position. As in the construction in FIG. 1, the over-riding pressure required is that sufficient to overcome the magnetic attraction between the magnet 12 and member 11 as well as the force applied by the spring 9'.

In the event it is desired to effect an adjustment of the member 11 the accelerator pedal 1 and thus the member 8 are brought to the desired speed position, either above or below that then set by the members 9 and 11, and when such desired position is reached, the switch 27 is actuated by pressure on the button 28, thereby closing the contacts 29. Power is thus conducted to the respective switches 26F and 26S and assuming that the new desired position of the accelerator pedal 1 is at a lesser speed than that set by the member 9, the member 8 will be out of engagement with the member 11, permitting the contact of switch 26S to be closed to apply power over the limit switch 24S to the winding 22S of the motor, and simultaneously therewith energizing the winding 32S of the switch 27. The motor 13' will thereby be actuated in a direction to axially move the screw 23 and thus the member 9 and magnet 12, and with it the engaged member 11 in a direction toward the new setting of the member 8 or to the left as viewed in FIGURE 2. This action will continue until the member 11 is brought into engagement with the member 8 at which point the contact of the switch 26S will open disconnecting power to the motor 13' and simultaneously causing deenergization of the winding 32S to permit the switch 27 to resume its normal rest position in which the contacts 29 are opened.

In the event the accelerator pedal had been moved to a new higher speed position, the general operation would be the same with the exception that the contacts of the switch 26F would now be closed as the new position of the member 8 has resulted in over-riding of the magnetic attraction of the magnet 12 and force of the spring 9' resulting in disengagement of the member 11 from the member 9 and closure of the contacts of the switch 26F to apply power to the winding 22F of the motor over limit switch 24F, and simultaneously energizing the winding 32F of the switch 27, again maintaining the switch in its actuated position until the member 11 engage the member 9 and contacts of the switch 26F are opened. It will be appreciated that the operation thus far described corresponds to a mechanized adjustment of the member 9 as compared to a manual adjustment by means of the handle 13 of the construction illustrated in FIG. 1. However, by actuating the cruise switch 17 to "on" position, power is applied through the normally closed contacts 31 and normally closed contacts of the redundant switch 21 to the electromagnet winding 14 whereby upon engagement of the member 8 with the member 11, such engagement will be maintained by the electromagnet 14, until the brake switch 4 is closed to actuate the relay 15 or actuation of switch 27 to effect an adjustment or actuation of switch 17 to render the "cruise" circuit inoperative.

The circuit illustrated in FIG. 2 also makes provision for rendering the mechanism entirely inoperative when the switch 33 is in the "off" position. This is accomplished by contacts 35 which are closed when the on-off switch 33 is in its "off" position, such contacts operatively supplying power to the movable armature of the limit switch 24F whereby, upon closure of the contacts 35, power is supplied from the ignition switch 19 to the limit switch 24 and winding 22F of the motor which is then operative to move the member 9 and with it the member 11 to the maximum speed position, whereby it will have no effect whatsoever on the normal action of the accelerator pedal 1. When the member 9 has reached the end of its travel to maximum speed position, the lug 25 will actuate the limit switch 24F thereby breaking the circuit to the winding 22F of the motor 13'.

Knob adjustable, compensated construction (FIG. 3)

The construction of FIG. 3 is quite similar to that of FIG. 2 but utilizes an adjusting knob which may be set to any desired speed position for controlling the adjustment of the device, and in addition provides for compensation in the vehicle speed responsive to variations in the operating conditions of the vehicle, as for example when proceeding up or down a hill or in response to other changes in the vehicle speed not involving changes in the accelerator pedal position.

The control mechanism 7 of FIG. 3 thus corresponds generally to that of FIG. 2 both as to the arrangement of the members 8, 9 and 11, motor 13' limit switches 24, electromagnetic winding 14 etc. with the main difference being in the arrangement of the switches 26S and 26F which are reversed with respect to the actuating members 8 and 9 and are of the normally-open type rather than the normally-closed type of FIG. 2.

Compensation is determined by a sensing device indicated generally by the numeral 37, the device illustrated being of the type illustrated in greater detail in co-pending application Ser. No. 635,881. This device comprises a rotatable armature 38 carried by a drive shaft 39 which is adapted to be suitably connected to a speed responsive member, as for example the speedometer shaft of the vehicle. Cooperable with the armature 38 is a cup shaped member 40 carrying permanent magnet means whereby the member 40 will endeavor to follow rotation of the armature 38 due to magnetic coupling between the two members. The cup 40 is rigidly mounted on a shaft 41 which is rigidly connected to the inner end of a spiral torsion spring 42, the outer end of which is connected to a bell crank 43 adapted to be adjusted by manual actuation of the knob 27'. The cup 400 will thus tend to assume a position in which the forces acting on the cup through the armature 38 will be counter-balanced by the spring 42 when the speed of the vehicle corresponds to the speed setting of the knob 27'. It might be mentioned that for purposes of simplicity the knob 27' is shown as being directly connected with the bell crank 43, in which arrangement a speed setting would be increased by movement of the knob 27' in counter clockwise direction and a decrease in clockwise direction. In actual practice it would be desirable to reverse the movement of the knob 27' by suitable means, for example gearing or the like, whereby an increase would be effected by the movement of the knob 27' in customary clockwise direction.

Rigidly mounted on the shaft 41 and thus moveable therewith is a disc 44 which carries a contact pin 45 disposed between and cooperable with stationary contacts 46F and 46S the moveable contact 45 being operatively connected through plate 44, shaft 41, spring 42, bell crank 43 and suitable conductor to common connection between the adjacent contact 34 of the switch 33 and contact of the cruise switch 17 connected thereto. Contact 46S is operatively connected to the motor 13' in series with the normally open contacts of the switch 26S' and the contacts of the limit switch 24S. In like manner the contacts 46F are operatively connected to the winding 22F of the motor 13' in series with the normally open contacts of the switch 26F' and the contacts of the limit switch 24F. The remainder of the circuit is generally the same as that illustrated in FIG. 2, with the exception that the "cruise" switch 17 is directly connected to the contacts 16 of the relay 15 and in the event a pilot light is desired to indicate actuation of the cruise circuit, the lamp 36 may be operatively connected to the conductor between the switch 17 and the contact 16.

In this arrangement operation of the motor 13' is under the primary control of the sensing device 37, more particularly the contacts 45, 46S and 46F, closure of contacts 45, 46S or 45, 46F being dependent upon the position of the knob 27' and the speed of the shaft 39 representing the vehicle speed. Assuming that switches 18, 19 and contacts 34 of switch 33 are closed (contacts of switch 17 being opened), and assuming that the vehicle is traveling at the speed for which the knob 27' is set, the accelerator pedal will be in a position in which the member 8 is in engagement with the member 11 and the contact pin 45 is out of contacting engagement with both of the contacts 46S and 46F, no power is applied to the motor 13' and the elements of the control mechanism 7 will be the positions illustrated in FIG. 3. If it were desired to hold this speed setting the switch 17 is actuated to "on" position whereby current is applied to the electromagnet winding 14 to automatically retain the member 8 in engagement with the member 11, such engagement continuing until the circuit to the electromagnet winding 14 is opened as for example by opening of the contacts 16 upon application of the brake pedal 3 or by opening of any of the other control switches 17, 18, 19, 21 or contacts 34 of switch 33.

To effect an adjustment of the system to a higher or lower speed, it is only necessary to rotate the knob 27' in the desired direction until it indicates the new desired speed setting. This will result in increasing or decreasing the force of the spring 42 applied to the shaft 41 and associated elements whereby, in the event the tension of the spring 42 has been increased, contact 45 will engage contact 46F, actuating the winding 22F of the motor and advancing the members 9, 11 and 8 to a position at which the accelerator setting will produce the desired speed, at which point the contact 45 will disengage the contact 46F, resulting in a stopping of the motor 13', and as long as the set speed is maintained the circuit will remain in the same condition. Should the speed of the vehicle change, for example, decrease as it may when the vehicle is going uphill, upon decrease in the vehicle speed the force applied from the armature 38 to the cup 39 will decrease permitting the spring 42 to pivot the disc 44 slightly in a counter clockwise direction, resulting in engagement of contacts 45 and 46F to effect energization of the winding 22F and accordingly move the accelerator pedal assembly in a speed increasing direction until compensation has been effected. In like manner if the vehicle speed should increase beyond the set speed, as for example, going downhill, the contacts 45 and 46S will be engaged, reversing the motor action and the moving the accelerator to a reduced speed position. It might be pointed out that the contact 45 is in effect trapped between the contacts 46F and 46S and thus has a very limited movement consistent with operational stability, as needle or equivalent is moveable over the entire speed range to cooperate with one or more stationary contacts at set speed positions etc.

Figure 4:
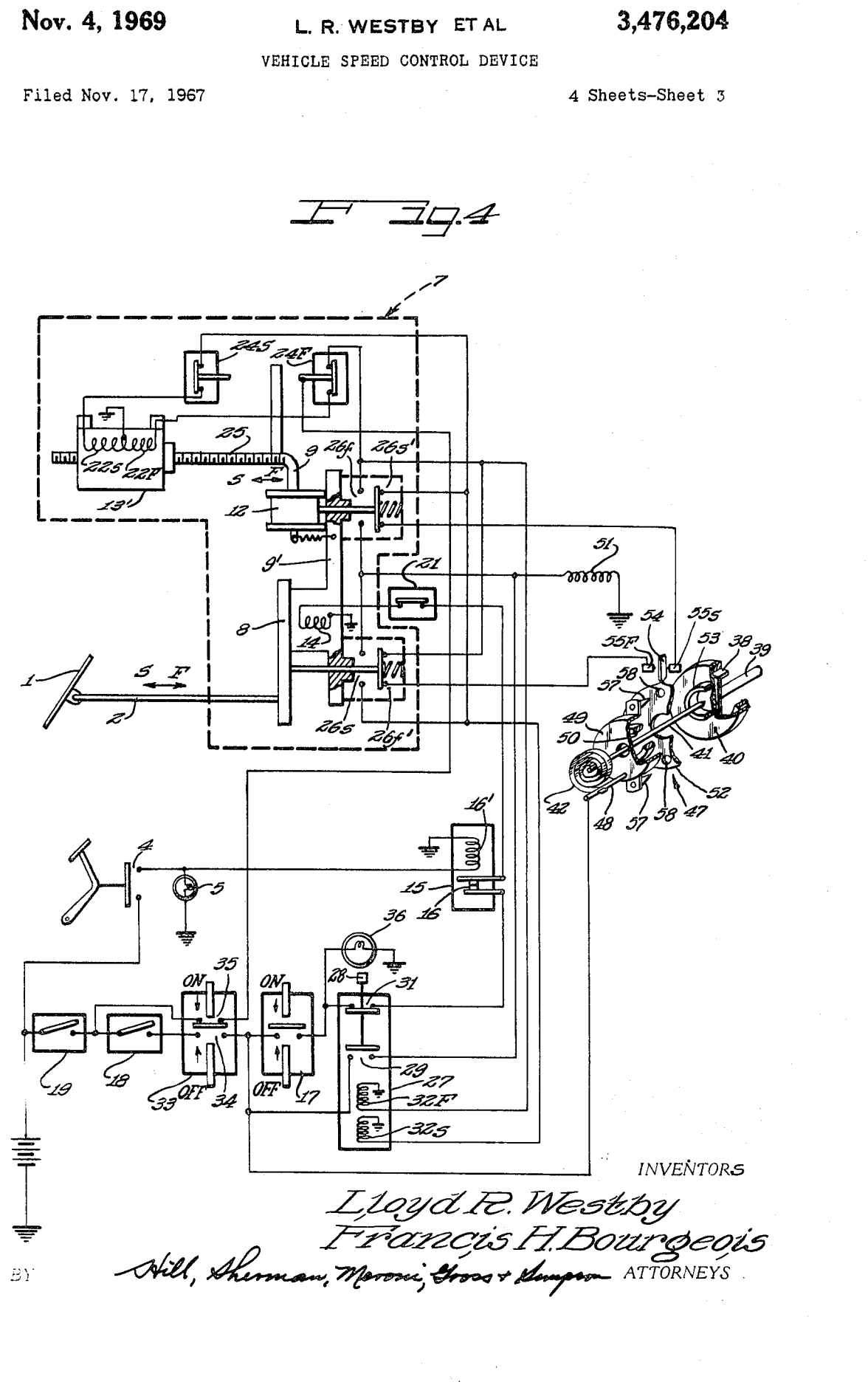

Push button adjustable, compensated construction (FIG. 4)

FIG. 4 illustrates a circuit which is very similar to that of FIG. 2 employing push button adjustment similar to that of FIG. 2 but including means for effecting a compensation for variations in the vehicle speed above or below that set.

As will be apparent from a comparison between FIGS. 2 and 4 general arrangement and circuit of FIG. 4 is substantially identical with that of FIG. 2 with exception of the switches carried by the member 11 and the addition of a sensing device for controlling the compensating action.

This arrangement utilizes a sensing device indicated generally by the numeral 47 which is of the type illustrated in our copending application Ser. No. 635,882, and employs a cup 40, armature 38 and driving shaft 39 which is adapted to be connected to a speedometer shaft or other speed responsive element with the shaft 41 and the cup 40 being biased by a counter-balancing spiral torsion spring 42, the free outer end of which, however, is fixedly supported on a stationary pin 48 which is illustrated as being mounted on a stationary cup shaped member 49 housing an electromagnet 50 the electrical winding of which is designated by the numeral 51. Cooperable with the cup 40 is a shuttle disc 52 which is adapted to be normally connected to and moveable with the cup 40, the means therefore including an annular shaped permanent magnet 53. The disc 52 is provided with a contact 54 cooperable with a pair of stationary contacts 55F and 55S, the contacts 54 and 55 generally corresponding to the contacts 45–46 of FIG. 3.

In operation, the shuttle disc 52 is releasably engageable with the cup 40 whereby its relationship with the cup, particularly that of the contact 54 may be adjusted so that the contact will be centered between the contact 65F and 65S when the cup 49 is disposed at a desired speed position. The shuttle disc 52 may be operatively disengaged from the cup 40 by energization of the electromagnet winding 51 which exerts a greater attraction on the disc than the permanent magnet 53 and results in axial movement of the disc away from the cup. To insure proper alignment of the disc 52 with respect to contacts 55F and 55S while the shuttle plate 52 is disconnected from the cup 40, the cup member 49 is provided with a plurality of conical shaped projections 57 (only two of which are illustrated in FIG. 4) which are cooperable with openings 58 in the shuttle disc 52 so that upon energization of the winding 51 and axial movement of the disc 52 the conical projections 57 will accurately center the disc in proper position. While these parts are illustrated in exploded relation in FIG. 4, the construction is such that the free ends of the projections 57 extend slightly through respective opening 58 when the shuttle disc is operatively engaged with the cup 40, with the openings 58 and the taper of the conical projections 57 being so proportioned that the shuttle plate when engaged with the cup 40 may freely engage either of the contacts 55F or 55S without interference from the projections 57. Electrical connection to the contact 54, when the shuttle 52 is connected with the cup 40 is effected through the pin 48, spring 42, shaft 41 and cup 40, suitable means being provided between the cup 40 and the shuttle 52 to insure good electrical conduction therebetween.

In this construction the switches carried by the member 11 are of double-pole, double-throw type, each having a pair of normally open contacts and a pair of normally closed contacts. The respective normally closed contacts 26f, 26s correspond to the switches 26F and 26S of FIG. 2 while the contacts 26s' and 26f' correspond to the switch contacts 26S' and 26F' of FIG. 3, and the respective circuits of these switches thus correspond to those illustrated in the corresponding figure. The circuit of FIG. 4 utilizes the same push button adjustment switch 27 as the construction of FIG. 2 which is circuited in the same manner, the only exception being that the winding 51 of the sensing device 47 also is connected to the adjacent contact 29 of the switch 27. As the respective portion of the circuit of FIG. 4 associated with the switches carried by the member 11 correspond to like portions of the circuits of FIG. 2 and 3 respectively, no need is seen in repeating the respective connections involved which will be apparent from the operation of the arrangement of FIG. 4.

Assuming that the vehicle is proceeding at the speed set by the member 11, with the switch 17 and the switch 27 being in "off" position, the contact 54 will be disposed between and out of engagement with the contact 55F and 55S and on current will flow in the circuit. In the event it is desired to change the speed setting, adjustment is made in the same manner as that previously described for the construction of FIG. 2, the accelerator pedal 1 being moved to the new position either by pressure relief on the pedal 1 or by additional over-riding pressure thereon to effect disengagement of the member 11 from the member 9. When the desired speed is reached the push button 28 is depressed, closing the contacts 29 and supplying current to the switches on the member 11. Assuming that the new speed is greated than that for which the device was originally set the member 11 will be out of engagement with the member 9 closing contacts 26f and opening contacts 26s'. Simultaneously therewith, the winding 32 of switch 27 will be energized to hold the button 28 in actuated position, power will thereby be applied to the winding 22F of the motor 13' to effect adjustment of the member 9 in a speed increasing direction until the contacts 26f are opened as a result of engagement of the member 9 with the member 11. During operation of the motor 13′, as a result of closure of the contacts 29 the electromagnet winding 51 of the sensing device 47 was likewise energized, resulting in disengagement of the shuttle disc 52 with the cup 40 throughout the adjusting procedure. However when the contacts 26f are opened, the switch 27 returns to its rest position opening the contacts 29 and deenergizing the winding 51 whereby the shuttle disc 52 returns into engagement with the cup 40 at the new speed setting, disposed between and out of engagement with the contacts 55F, 55S. The control of the motor 13′ is now under the control of the contacts 54, 55F and 55S which are cooperable with the contacts 26s′ and 26f′, corresponding to the switches 26S′ and 26F′ of FIG. 3, and compensation will take place in the same manner as described in connection with the circuit of FIG. 3. Thus the circuit of FIG. 4 enables adjustment by bringing the vehicle to the desired speed and actuation of the push button 28 whereby the control mechanism 7 will be automatically adjusted to the desired speed, following which control is returned to the sensing device 47 to effect compensation for subsequent speed variations.

The remainder of the circuit corresponds to that previously described for FIGS. 2 and 3, and as previously described, the "on-off" switch 33 may be so constructed that upon actuation to the "off" position the member 9 will be moved to a maximum speed posititon whereby it will have no effect on the actuation of the accelerator pedal 1.

Radio controlled construction (FIG. 5)

The present invention, particularly the construction of FIG. 3 may be readily utilized for remote control of the adjusting procedures, as for example by radio. It will be apparent that this may be readily accomplished in the circuit of FIG. 3 by employing remotely controlled means for varying the action of the spring 42. FIG. 5 merely illustrates the pertinent elements of the sensing device 37 of FIG. 3, the construction being substantially identical therewith, with the exception that the contact 45 is illustrated as being directly mounted on the cup 40 instead of upon a separate disc. The outer end of the spring 42 is operatively connected to a rotary disc 61 which is rigidly mounted on a shaft 62 along with similar discs 63 and 64. It might be mentioned that the discs 61, 63 and 64 are illustrated as separate members, each with their own individual cooperable elements to simplify the showing and facilitate an understanding thereof. It will be apparent from the following disclosure that as a practical matter, the respective discs may be consolidated into two or even a single disc.

The disc 63, in the embodiment illustrated, constitutes the actuating disc and is provided with two crescent-shaped armatures 65 and 65′ which are cooperable with a plurality of electromagnets having windings 66a, 66b, 66c, 66d and 66e. This constructiton corresponds to that illustrated in our co-pending application Ser. No. 635,881 wherein the electromagnets are so disposed with respect to the armatures 65, 65′ that upon energization of one of the electromagnet windings the armature will be rotated until the hump or projection 65″ thereon is in alignment with the energized winding.

Associated with the disc 64 are a plurality of switches 67a–67e, the switches being adapted to be actuated from their normally closed position to an open position by one of two magnets 64′ mounted on the disc 64. The construction of the switches 67 is such that when a cooperable magnet 64′ is in alignment therewith, for example, the upper magnet 64′ disposed adjacent the contacts 67c, the latter are thereby actuated to open position.

Also cooperable with the disc 64 is a brake member 68 which is adapted to bear on the periphery of the disc 64 under the force exerted by a compression spring 69, the brake member 68 being releasable from the disc 64 energization of the solenoid winding 71.

The disc 61 is provided with respective V-shaped notches 72a–72e which are cooperable with a complementary shaped detent member 73 which is urged into engagement with the disc 61 by a compression spring 74 and adapted to be released from engagement with the disc by energization of the solenoid winding 75.

Each of the electromagnet windings 66a–66e are operatively connected by respective switches 67a–67e with a corresponding terminal A–E of the radio receiver 76, the switches 67 being normally closed and adapted to be open when a corresponding magnet 64′ is in alignment therewith, as for example the contacts 67c illustrated in FIG. 5. The solenoid windings 71 and 75 are adapted to be operatively connected in parallel with the respective magnet windings 66a–66e by means of respective isolating diodes 77 which are connected in series with respective magnet windings and the solenoid windings 71 and 75 to prevent feedbacks. A pulsing device 78 also is connected in series between the diodes 77 and the solenoid winding 71, which pulsing device may be of any suitable construction, as for example, as illustrated, comprising a pair of contacts one of which is bimetallic and adapted to be heated by a small heating coil which is energized when the contacts thereon are open, operative to close the contacts and short out the heating element whereby on cooling the contacts will subsequently open with the cycle thereafter being repeated. The pulsing device may be so constructed that its pulsing frequency is, for example, three cycles per sceond. The operation of the construction of FIG. 5 is as follows:

Assuming that the discs 61, 63 and 64 are in the positions illustrated in FIG. 5 and the terminal A is energized in response to a signal received by the radio 76, power will be applied over contacts 67a to the magnet winding 66a and through the corresponding diode 77 to the winding 75, energizing the latter and drawing the detent 73 out of engagement with the disc 61. Simultaneously therewith the pulser 78 will begin operation intermittently energizing the winding 71 and correspondingly intermittently drawing the brake member 68 out of engagement with the disc 64, permitting the latter to rotate in response to the co-action between the armature 65 and the winding 66a. The pulser 78 is incorporated in the circuit to the winding 71 to provide an intermittent application of braking forces to the disc 64 and thus to the entire rotating assembly to provide a damping action thereon and prevent possible over-travel and hunting. This action is further supplemented by that of the detent 73 which upon opening of the switch 67a and corresponding de-energization of the winding 75, engages the disc 61. Due to the configuration of the notches 72 and the detent 73, in the event the disc is not in exact alignment it will be cammed into proper alignment as the detent 73 becomes fully engaged in the corresponding notch 72a. The action of the pulser and of the detent structure is particularly effective when the movement of the disc is in the same direction as the force applied to the shaft 62 by the spring 42.

The radio controlled structure of FIG. 5 thus is operative to mechanically adjust the tension of the spring 42 in accordance with the received signals. As illustrated, the shaft 62 may also be provided with a manually rotatable knob 27′ by means of which the discs 61, 63 and 64 may be manually rotated to the desired position. In this case, it is unnecessary to actuate either the brake 61 or the detent 73 as the forces applied thereby to their cooperable discs may be relatively easily overcome by the application of manual force to the knob 27′.

Push button construction with electrical control (FIG. 6)

The general concept exemplified by the construction illustrated in FIG. 5 is not restricted to actuation in response to radio signals or by a manually actuated knob but may also be constructed for push button operation wherein a series of push buttons may be provided, each of which represents a different speed setting, the push buttons being suitably constructed, in known manner, whereby an actuated push button will remain in a depressed condition until another button is depressed. Such a construction is schematically illustrated in FIG. 6 wherein each of the switches A'–E' comprise a pair of contacts adapted to be normally open and adapted to be closed by depression of the corresponding button. In this construction one contact of each pair is connected in common and would be connected to a suitable source of power while each of the other contacts are connected to the terminals A–E in place of the radio terminals. Thus upon depression of one of the switches, as for example the switch C', the corresponding magnet winding 66c would be energized, (assuming that the armature 65 is not aligned therewith) and the operation of the switches 66, brake 68 and detent 73 would take place in the same manner as that heretofore described in connection with the radio controlled arrangement.

It will be noted that the present invention provides a very effective speed control system of comparatively simple and foolproof construction substantially completely employing components which incorporate tried mechanical and electrical principles, and results in a system which is relatively inexpensive to produce, very efficient and durable in operation and which provides a maximum of safety in its operation, introducing substantially no additional load or inertia in the vehicle control system such as the accelerator pedal 1 and associated linkage to the carburetor etc.

Likewise while we have illustrated various switches and the like, as for example the governor switch 18 and the redundant switch 21, the system is operative with the omission of such switches, and in like manner the relay 15 may be replaced by an additional pair of contacts actuatable by the brake pedal 3, of normally-closed type which may be substituted for the contacts 16 of the relay. However, the use of the relay enables installation of the system with a minimum of alteration to the vehicle. Likewise the system will readily function without circuitry for advancing the member 9 to its maximum speed position when the switch 33 is actuated to "off" position. The inclusion of such circuitry, however, adds considerably to the flexibility of the system.

Likewise, while the control and sensing devices illustrated in our previously referred to co-pending applications are particularly suitable for use in the present systems, the principle of the present invention may also be utilized with control and sensing devices of different construction.

We claim:

1. A vehicle speed control system adapted to be operatively connected to the manual throttle and brake systems of a vehicle, comprising a control actuating mechanism having a member constructed for operative connection to such a vehicle throttle, a speed adjusting member cooperable with said first member for determining the adjusted position of the latter, and a third member forming the operative connection between said first two members, releasable means operatively connecting said second and said third intermediate members operative to release upon the application of over-riding pressure on such manual throttle of a vehicle, releasable means operatively connecting said first and intermediate members, and means for operatively connecting said last mentioned releasable means to such brake system of a vehicle, responsive to actuation thereof, to effect release of said first member from the intermediate member.

2. A vehicle speed control system according to claim 1, wherein said first mentioned releasable means comprising permanent magnet means, and said second mentioned releasable means comprises electromagnetic means, said connecting means for the latter comprising switch means for controlling the energizing of said electromagnetic means in response to actuation of the brake system of such a vehicle and means for selectively rendering said electromagnetic means inoperable.

3. A vehicle speed control according to claim 2, wherein said connecting means for said electromagnetic means comprises an electromagnetic relay, the energizing winding of which is constructed for operative connection to the brake like circuit of such a vehicle, operative upon actuation of such circuit to effect de-energization of said electromagnetic means.

4. A vehicle speed control according to claim 2, wherein said speed adjusting member comprises a manually adjustable member.

5. A vehicle speed control according to claim 2, comprising in further combination a reversible electric motor operatively connected to said speed adjusting member for effecting the adjustment thereof, and means for controlling the operation of said motor.

6. A vehicle speed control according to claim 5, wherein said control means for said motor comprises a manually operable switch, operable upon actuation thereof to render said electromagnetic means inoperable and to energize said motor, and control means responsive to the relation of said intermediate member with respect to said first and second members to control the direction and duration of actuation of said motor to effect operational engagement of said first, second actuated members.

7. A vehicle speed control according to claim 6, wherein said control means for effecting engagement of said members comprises switch means responsive to relative movement between said first and intermediate members, and switch means responsive to movement between said second and intermediate members.

8. A vehicle speed control according to claim 7, comprising limit switches cooperable with said motor for stopping the same at the extreme limits of travel of said speed adjusting member associated therewith, a master "on-off" switch for controlling said electrical circuits, and means operatively connecting said "on-off" switch and the limit switch controlling the maximum speed position of said speed adjusting member, operable to effect actuation of the motor to move said speed adjusting member to such maximum position when said "on-off" switch is in "off" position.

9. A vehicle speed control according to claim 7, comprising in further combination means cooperable with said manual switch for retaining said motor control circuit operative until the desired adjustment is reached.

10. A vehicle speed control according to claim 9, wherein said switch cooperable means comprises electromagnetic means.

11. A vehicle speed control according to claim 10, wherein said switch cooperable electromagnetic means is constructed to physically retain said manual switch in actuated position until the desired adjustment is reached.

12. A vehicle speed control according to claim 5, comprising in further combination, speed responsive means operatively connected to said motor for controlling the latter in response to speed variations of such a vehicle, and means for adjusting said speed responsive means for changing the speed at which it is responsive.

13. A vehicle speed control according to claim 9, comprising in further combination, speed responsive means operatively connected to said motor for controlling the latter in response to speed variations of such vehicle, and means for adjusting said speed responsive means for changing the speed at which it is responsive.

14. A vehicle speed control according to claim 13, wherein said speed responsive means comprises a movable speed responsive element, the position of which is dependent upon the instantaneous speed of such a vehicle, switch means operatively connected to said motor, and a member releasably connectable to said responsive element for actuating said last-mentioned switch means in accordance with relative positions of said speed responsive element.

15. A vehicle speed control according to claim 14, wherein release of said releasable member is effected by electro-magnetic means operatively connected to and controlled by said adjustable switch.

16. A vehicle speed control according to claim 5, wherein said speed responsive means comprises a movable speed responsive element said element having an intermediate position and closely adjacent extreme positions at each side of said intermediate position, spring means for biasing said element to control the position of said element for various vehicle speeds, switch means operatively connected to said motor disposed for actuation by said speed responsive element at the respective extreme positions thereof, and adjustable means operatively connected to said spring biasing means for varying the biasing action thereof, to selectively determine the vehicle speed at which said intermediate position is maintained.

17. A vehicle speed control according to claim 16, wherein said adjustable means for said spring-biasing means includes a manually actuatable member.

18. A vehicle speed control according to claim 6, wherein said adjustable means for said spring biasing means includes a moveable adjusting member, electromagnet means cooperable with said adjusting member for selectively effecting adjustment thereof.

19. A vehicle speed control according to claim 18, wherein said electromagnet means is constructed for connection thereof to respective output means of a radio receiver and selectively actuatable thereby in response to signals received by such a receiver.

20. A vehicle speed control according to claim 18, comprising in further combination, manual switch means operatively connected to said electromagnet means for effecting selective actuation thereof.

References Cited

UNITED STATES PATENTS

| | | | |
|---|---|---|---|
| 2,477,865 | 8/1949 | DuCharme | 192—3 |
| 2,755,877 | 7/1956 | Kelem. | |
| 2,987,054 | 6/1961 | Eddy | 123—102 |
| 3,077,239 | 2/1963 | Simas | 123—102 X |
| 3,090,460 | 5/1963 | Teetor | 123—102 X |
| 3,239,026 | 8/1966 | Marie | 123—102 X |
| 3,322,226 | 5/1967 | Marshall et al. | 123—102 X |
| 3,368,639 | 2/1968 | Deane | 180—98 |

KENNETH H. BETTS, Primary Examiner

U.S. Cl. X.R.

123—102; 180—105, 110; 192—3

PO-1050
(5/69)

UNITED STATES PATENT OFFICE
CERTIFICATE OF CORRECTION

Patent No. 3,476,204                   Dated November 4, 1969

Inventor(s) Lloyd R. Westby and Francis H. Bourgeois

It is certified that error appears in the above-identified patent and that said Letters Patent are hereby corrected as shown below:

Col. 5, line 1, omit "be".

Col. 6, line 68, change "decreasing" to --increasing--.

Col. 8, line 27, change "400" to --40--.

Col. 9, line 40, after "as" insert --distinguished from the usual "speed switches" wherein a speedometer--

Col. 10, line 57, change "on" to --no--.

Col. 12, line 41, change the period (.) to -- , (comma)--.

Col. 13, line 70, change "comprising" to --comprises--.

Col. 13, line 74, change "energizing" to --energization--.

SIGNED AND
SEALED
JUN 16 1970

(SEAL)
Attest:

Edward M. Fletcher, Jr.
Attesting Officer

WILLIAM E. SCHUYLER, JR.
Commissioner of Patents